1

United States Patent Office 2,949,470
Patented Aug. 16, 1960

2,949,470

PYRROLIDINO-2,6-DIMETHYLACETANILIDE

Albert Schlesinger, Jackson Heights, and Samuel M. Gordon, Forest Hills, N.Y., assignors to Endo Laboratories Inc., Richmond Hill, Queens, N.Y., a corporation of New York No Drawing. Original application Mar. 27, 1956, Ser. No. 574,092, now Patent No. 2,813,861, dated Nov. 19, 1957. Divided and this application Oct. 11, 1957, Serial No. 700,244

1 Claim. (Cl. 260—326.3)

This application is a division of application Serial Number 574,092, filed March 27, 1956, and now U.S. Patent Number 2,813,861.

This invention relates to novel addition salts of 8-[2'-methoxy-3'-(7-theophyllinyl mercuri)] propylcoumarin-3-carboxylic acid having the structural formula:

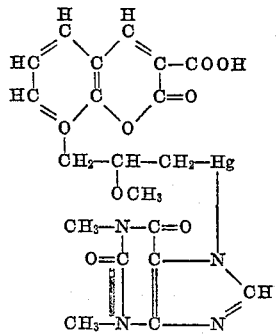

The alkali metal salts of the above mentioned compound, designated as mercumatilin by the American Medical Association (New and Nonofficial Remedies, 1954, page 350) are particularly effective as diuretics. They may be administered per os or by intravenous or intramuscular injection.

It is known that metal compounds sometimes, and mercuri-derivatives in particular, show side effects when administered intramuscularly, and especially upon subcutaneous application. These side effects are evidenced by sensation of pain or allergic manifestation. In general, mercurial diuretics are not well tolerated when administered by the subcutaneous route.

It is among the principal objects of this invention to provide a novel salt of mercumatilin which is featured by the absence of side reactions such as pain or allergic manifestations when administered intramuscularly and is well tolerated when introduced via the subcutaneous route.

An even more particular object of this invention is to provide a novel salt of mercumatilin prepared from a novel base which possesses local anesthetic characteristics, more particularly the pyrrolidino-aceto-2,6-dimethylanilide of the following formula:

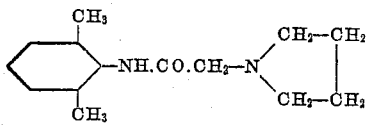

The known local anesthetics are in general esters which are easily hydrolyzed in aqueous solution; a characteristic which appears in some of the salts thus formed with the aforesaid mercuri-theophylline complex (mercumatilin).

The known local anesthetics of more stable structure, such as ketones or ethers, however do not have the fast-acting and lasting effect which is desired, or are too toxic or do not possess the very important feature of this invention, to wit, good aqueous solubility of the salt.

The new pyrrolidino-aceto-2,6-dimethylanilide, is a local anesthetic with fast and lasting action, of low toxicity and forms an excellent water soluble salt with mercumatilin having the formula:

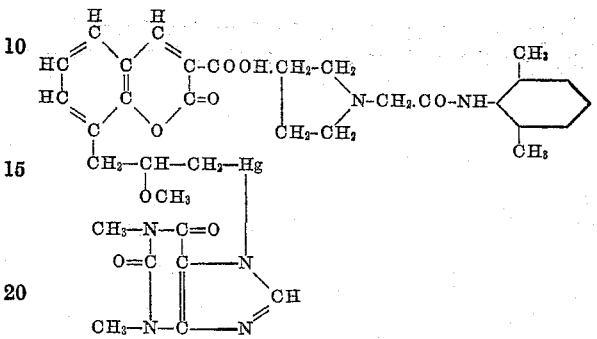

The salt is easily soluble in water and forms a stable solution of about pH=6.8–7. The solution so prepared contains 40 mg. of mercury per cc. These solutions are well tolerated by intramuscular as well as subcutaneous injection.

The pyrrolidino-aceto-2,6-dimethylanilide is prepared by the reaction of chloro-aceto-2,6-dimethylanilide with an excess of pyrrolidine.

The following examples are illustrative of the compounds of this invention:

EXAMPLE 1

*Pyrrolidino aceto-2,6-dimethyl anilide*

38 grams of chloro-acetyl-2,6-dimethylanilide and 45 grams of pyrrolidine in 300 cc. of anhydrous benzene are refluxed for five hours. The solution is cooled and 200 cc. of water and 50 cc. of concentrated hydrochloric acid are added, and shaken in a separatory funnel. The water solution is then alkalized with 70 cc. sodium hydroxide solution (40 percent) and the new base is extracted with ether. The ethereal solution is dried over anhydrous $K_2CO_3$, filtered and evaporated. The residue is dissolved in 100 cc. of hexane by heating on the water bath, then cooled in an ice bath. The base crystallizes and is filtered on a Buchner funnel, washed with pentane and dried in a desiccator.

Yield=36 grams=82 percent, M.P. 83° C. HCl salt, crystallized from isopropanol M.P. 205° C.

Molecular weight=$C_{14}H_{20}N_2O \cdot HCl$—268.77. Calculated: Cl=13.19 percent. Found: Cl=13.24 percent.

EXAMPLE 2

*Solution of 8-[2'-methoxy-3'-(7-theophyllinyl mercuri)] propyl-coumarin-3-carboxylic acid-pyrrolidino-aceto-2,6-dimethylanilide*

8.2 grams of theophylline U.S.P. are suspended in 160 cc. of water and with stirring 10 grams pyrollidino-aceto-2,6-dimethylanilide (the product of Example 1) are added thereto. After stirring for ten minutes, 19.2 grams of 8-(2'-methoxy-3'-hydroxy-mercuri-propyl)-coumarin-3-carboxylic acid are added in small portions and then the mixture is heated with stirring until 70° C. The solution is cooled to room temperature and distilled water is added to bring the volume to 200 cc. pH=6.9.

This solution is aseptically filtered and filled in ampules for administration by injection. 1 cc. of the solution contains 40 mg. of mercury. The solutions are stable and are tolerated without pain.

EXAMPLE 3

Dry salt of Example 2

20 cc. of the solution of Example 2 are evaporated under vacuum and the residue dissolved in hot isopropanol. Upon the addition of ether to the cooled isopropanol solution, the salt of pyrrolidino-aceto-2,6-dimethylanilide mercumallylic acid precipitates. It is filtered on a Buchner filter and dried in a desiccator. It has a melting point of 150° C. It is readily soluble in water. Molecular weight of $C_{35}H_{40}N_6O_8Hg=873.33$. Calculated: Hg=22.97 percent. Found: Hg=22.85 percent.

It will be understood that the foregoing description of the invention and the examples set forth are merely illustrative of the principles thereof. Accordingly, the appended claim is to be construed as defining the invention within the full spirit and scope thereof.

We claim:

Pyrrolidino-aceto-2,6-dimethyl aniline.

References Cited in the file of this patent

FOREIGN PATENTS 634,072     Great Britain _____ Mar. 15, 1950

OTHER REFERENCES

Svensk Kemisk Tidskrift, vol. 58 (1946), pp. 211 and 213.

Richters: Organic Chemistry, vol 3, pp. 3 to 4 (1923).